(12) United States Patent
Newbold et al.

(10) Patent No.: US 12,172,581 B2
(45) Date of Patent: Dec. 24, 2024

(54) DEPLOYABLE PERSONAL ENTERTAINMENT DEVICE HOLDER

(71) Applicant: Safran Seats USA LLC, Gainesville, TX (US)

(72) Inventors: Tyler L. Newbold, Sherman, TX (US); Stephen D. Angliss, Denton, TX (US); Kyle Kayfus, Shady Shores, TX (US); Juan Francisco Lopez Chavira, Chihuahua (MX); Paul R. Bentley, Gainesville, TX (US)

(73) Assignee: Safran Seats USA LLC, Gainesville, TX (US)

( * ) Notice: Subject to any disclaimer, the term of this patent is extended or adjusted under 35 U.S.C. 154(b) by 333 days.

(21) Appl. No.: 17/632,352

(22) PCT Filed: Aug. 30, 2019

(86) PCT No.: PCT/US2019/049145
§ 371 (c)(1),
(2) Date: Feb. 2, 2022

(87) PCT Pub. No.: WO2021/040740
PCT Pub. Date: Mar. 4, 2021

(65) Prior Publication Data
US 2022/0289118 A1 Sep. 15, 2022

(51) Int. Cl.
*B60R 11/02* (2006.01)
*B60R 11/00* (2006.01)

(52) U.S. Cl.
CPC ....... *B60R 11/02* (2013.01); *B60R 2011/0017* (2013.01); *B60R 2011/0082* (2013.01); *B60R 2011/0087* (2013.01)

(58) Field of Classification Search
CPC ................. B60R 11/02; B60R 2011/0017
See application file for complete search history.

(56) References Cited

U.S. PATENT DOCUMENTS 6,966,533 B1 * 11/2005 Kalis .................. B60R 11/0241
248/316.4
7,111,814 B1 * 9/2006 Newman ............. B60R 11/0235
297/188.2

(Continued)

FOREIGN PATENT DOCUMENTS

| DE | 10037346 A1 | 2/2002 |
| DE | 202015101786 U1 | 7/2016 |
| WO | 2012129116 A2 | 9/2012 |

OTHER PUBLICATIONS

International Patent Application No. PCT/US2019/049145, International Search Report and Written Opinion, dated Oct. 30, 2019.

*Primary Examiner* — Brian D Nash
(74) *Attorney, Agent, or Firm* — Kilpatrick Townsend & Stockton LLP

(57) ABSTRACT

Described are supports for holding a portable electronic device. The support includes a body having an upper pivot location and a lower pivot location relative to a passenger seat back, a support structure coupled to the body, and a plurality of projections extending from a surface of the support structure. Each projection is shaped to receive a lower edge of a portable electronic device and secure the portable electronic device to the body when the portable electronic device is received by the plurality of projections.

19 Claims, 10 Drawing Sheets

(56) References Cited

U.S. PATENT DOCUMENTS

| | | | | |
|---|---|---|---|---|
| 7,597,393 | B1* | 10/2009 | Tuccinardi | B60R 11/0211 |
| | | | | 297/217.3 |
| 9,273,824 | B1* | 3/2016 | Tsai | F16M 11/105 |
| 10,118,526 | B1* | 11/2018 | Fan | B60N 2/882 |
| 2008/0252118 | A1* | 10/2008 | Chang | B60R 11/0235 |
| | | | | 297/217.3 |
| 2009/0089841 | A1* | 4/2009 | Hanlon | B60R 11/0235 |
| | | | | 725/75 |
| 2010/0224744 | A1* | 9/2010 | Curatolo | H04M 1/04 |
| | | | | 24/442 |
| 2012/0241572 | A1* | 9/2012 | McClain | B64D 11/0638 |
| | | | | 248/220.21 |
| 2012/0312847 | A1* | 12/2012 | LaColla | B60R 11/02 |
| | | | | 224/275 |
| 2013/0070171 | A1* | 3/2013 | Boyer, Jr. | B64D 11/0638 |
| | | | | 348/E5.132 |
| 2013/0193174 | A1 | 8/2013 | Ackeret et al. | |
| 2013/0200119 | A1* | 8/2013 | Ackeret | B60R 7/04 |
| | | | | 224/275 |
| 2015/0115009 | A1* | 4/2015 | Stauber | B60R 11/02 |
| | | | | 224/275 |
| 2016/0176357 | A1* | 6/2016 | Maslakow | F16M 13/00 |
| | | | | 29/428 |
| 2018/0065567 | A1 | 3/2018 | Osterhoff et al. | |
| 2019/0248299 | A1* | 8/2019 | Shain | B60R 11/00 |
| 2019/0263326 | A1* | 8/2019 | Yu | F16M 11/14 |
| 2022/0396215 | A1* | 12/2022 | Morales | B60R 11/02 |

\* cited by examiner

DEPLOYABLE PERSONAL ENTERTAINMENT DEVICE HOLDER

CROSS-REFERENCE TO RELATED APPLICATIONS

This application is a national stage application of International Patent Application PCT/US2019/049145, filed on Aug. 30, 2019 and titled DEPLOYABLE PERSONAL ENTERTAINMENT DEVICE HOLDER, the content of which is hereby incorporated by reference in its entirety.

FIELD OF THE INVENTION

The field of the invention relates to support structures attached to passenger seats.

BACKGROUND

On many short haul flights, entertainment systems are not provided in passenger seat backs. To provide entertainment to passengers on these flights, airlines may offer movies and shows that can be accessed wirelessly through the aircraft's in-flight entertainment system and viewed on passengers' personal electronic devices. Unfortunately, these seats are not provided with any structure to hold these personal electronic devices. Thus, there is a need to provide structures built into passenger seats that can hold personal electronic devices and allow passengers to view their devices hands-free.

Current solutions to this problem include a tray that folds down from the passenger seat back. The main disadvantage of these trays are that the deployed position remains the same regardless of whether the passenger seat back is upright or reclined. For example, if a passenger seated in row B places a tablet on the fold down tray, and a seated in row A reclines his seat, the tablet can fall out.

Another solution on the market has a channel built into the passenger's food table. This design puts the tablet close to the passenger's knees, which is outside of the natural viewing angle of the passenger. Another issue with this design is that it limits the size of the devices that can be used with it. If a device is larger than the channel, it would not be compatible.

Yet another solution on the market has a fold out tray and a retaining device that holds a top of the personal electronic device in place. The main disadvantage of this solution is that it also limits the size of the tablet that can used with the holder. Furthermore, the retaining device can be damaged by a passenger.

Thus, there is a need for a solution that allows the personal electronic device to be secured in an adjustable manner that allows the personal electronic device to be viewed from a variety of angles, as well as positioning the personal electronic device in a location that aligns with a natural viewing angle of a passenger, and conserving space above the table holder for other amenity items.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a support for holding a portable electronic device comprises a body having an upper pivot location and a lower pivot location relative to a passenger seat back, a support structure coupled to the body, and a plurality of projections extending from a surface of the support structure, wherein each projection is shaped to receive a lower edge of a portable electronic device and secure the portable electronic device to the body when the portable electronic device is received by the plurality of projections.

According to further embodiments of the present invention, a support for holding a portable electronic device comprises a body comprising a support structure configured to secure the portable electronic device to the body when the portable electronic device is received, a pair of first pivot arms coupled to an upper region of the body to create an upper pivot location, wherein the upper pivot location is adjustable along an arc of rotation of the first pivot arms relative to a passenger seat back, and a pair of second pivot arms coupled to a lower region of the body to create a lower pivot location, wherein the lower pivot location is adjustable along an arc of rotation of the second pivot arms relative to a passenger seat back.

According to yet further embodiments of the present invention, a support for holding a portable electronic device comprises a body comprising a support structure configured to secure the portable electronic device to the body when the portable electronic device is received, wherein the body is coupled to a passenger seat via a pair of multibar mechanisms, each multibar mechanism comprising an upper pivot arm and a lower pivot arm, wherein the body comprises an upper pivot location that is adjustable by rotation of the upper pivot arms about a first connection point on the passenger seat back, and wherein the body comprises a lower pivot location that is adjustable by rotation of the lower pivot arms about a second connection point on the passenger seat back.

An upper edge of the portable electronic device may extend above the upper pivot location. In some embodiments, an amenity item may be coupled to the passenger seat back above a location where the body is coupled to the passenger seat back, wherein an upper edge of the portable electronic device may overlap the amenity item when viewed by a person facing the passenger seat back. In certain embodiments, the body has a stowed position within a recess of the passenger seat back. Each first pivot arm may be coupled to the passenger seat back via a torsion hinge and/or each second pivot arm may be coupled to the passenger seat back via an additional pivot arm.

DETAILED DESCRIPTION

Figure 1:
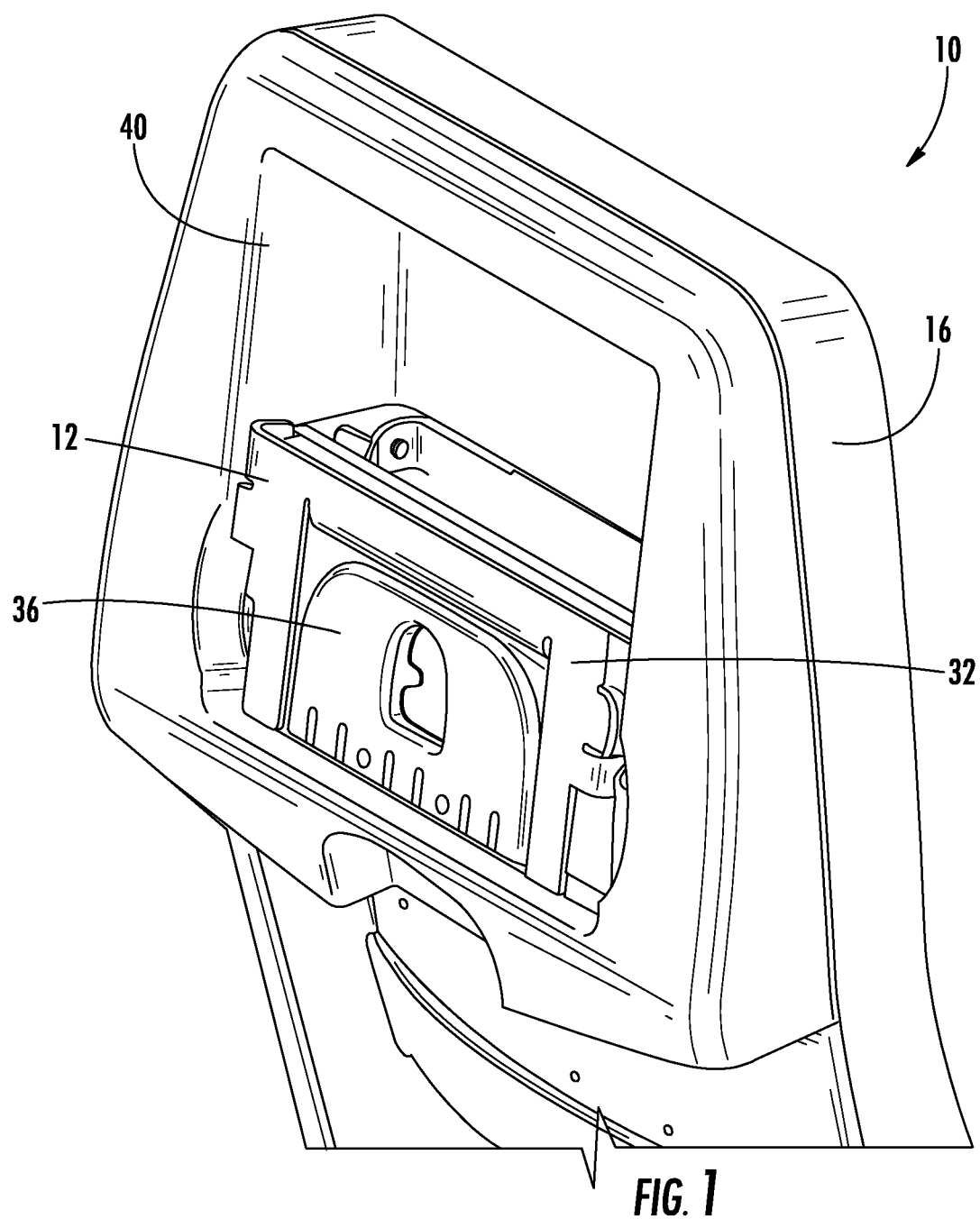
FIG. 1 is a perspective view of a passenger seat back with a support, according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

As best illustrated in FIGS. 1-10, the described embodiments of the invention provide a support 10 for holding a personal electronic device ("PED") 14. In certain embodiments, the support 10 comprises a body 12 that is coupled to a passenger seat back 16.

The body 12 may be coupled to the passenger seat back 16 in multiple locations. For example, the body 12 may comprise an upper pivot location 18, which be located along an upper region of the body 12. Similarly, the body 12 may comprise a lower pivot location 20, which be located along a lower region of the body 12.

In some embodiments, the body 12 is connected to the passenger seat back 16 via a multibar mechanism 22. This multibar mechanism 22 may comprise an upper pivot arm 24 and a lower pivot arm 26. One end of the upper pivot arm 24 may be coupled to the upper pivot location 18, and one end of the lower pivot arm 26 may be coupled to the lower pivot location 20. As a result, the body 12 may operate as if there is a hinge in space above the body 12, which prevent a large PED 14 from colliding with other features of the passenger seat.

As shown in FIGS. 2-6 and 9-10, an opposing end of the upper pivot arm 24 may be coupled to the passenger seat back 16 via a torsion hinge 28. The torsion hinge 28 allows the upper pivot arm 24 (and thus the upper pivot location 18 of the body 12) to rotate away from the passenger seat back 16 so that an upper edge of the PED 14 held by the support 10 is not limited by the vertical shape of the passenger seat back 16 above the body 12. Furthermore, the torsion hinge 28 may provide a means to maintain the body 12 in desired position until it is re-positioned.

As shown in FIGS. 2-6 and 9-10, an opposing end of the lower pivot arm 26 may be coupled to the passenger seat back 16 via an additional pivot arm 30. The additional pivot arm 30 allows the lower pivot arm 26 to be rotated relative to the passenger seat back 16 to adjust the angle of the body 12 relative to the upper pivot location 18. For example, when a passenger adjusts a location of the upper pivot location 18 away from the passenger seat back 16, a surface 32 of the body 12 is facing in a downward direction. In order to change the angle of the surface 32 so that the surface 32 is not facing downward, the passenger must also adjust the lower pivot location 20 away from the passenger seat back 16.

The body 12 may further comprise a support structure 36 that is configured to secure the PED 14 to the body 12. The support structure 36 may comprise one or more projections 34 that are shaped to receive a lower edge of the PED 14 and secure the PED 14 to the body 12. The projections 34 may be spaced along a surface of the support structure 36 to support additional viewing angles and/or to support smaller devices. Specifically, the support structure 36 is configured to secure a PED ranging from 2-24 inches in width and 2-24 inches in height.

Figure 2:
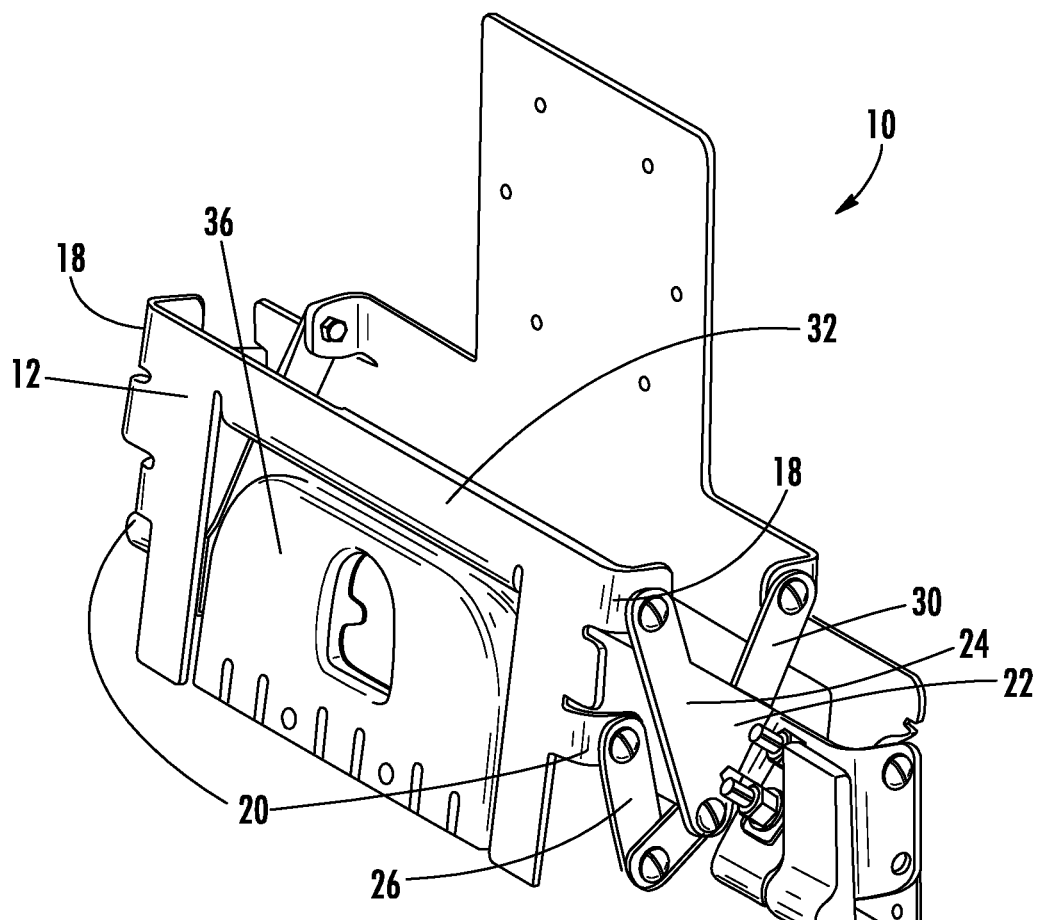
FIG. 2 is a perspective view of the support of FIG. 1 showing the body and the support structure in a stowed position.
Figure 3:
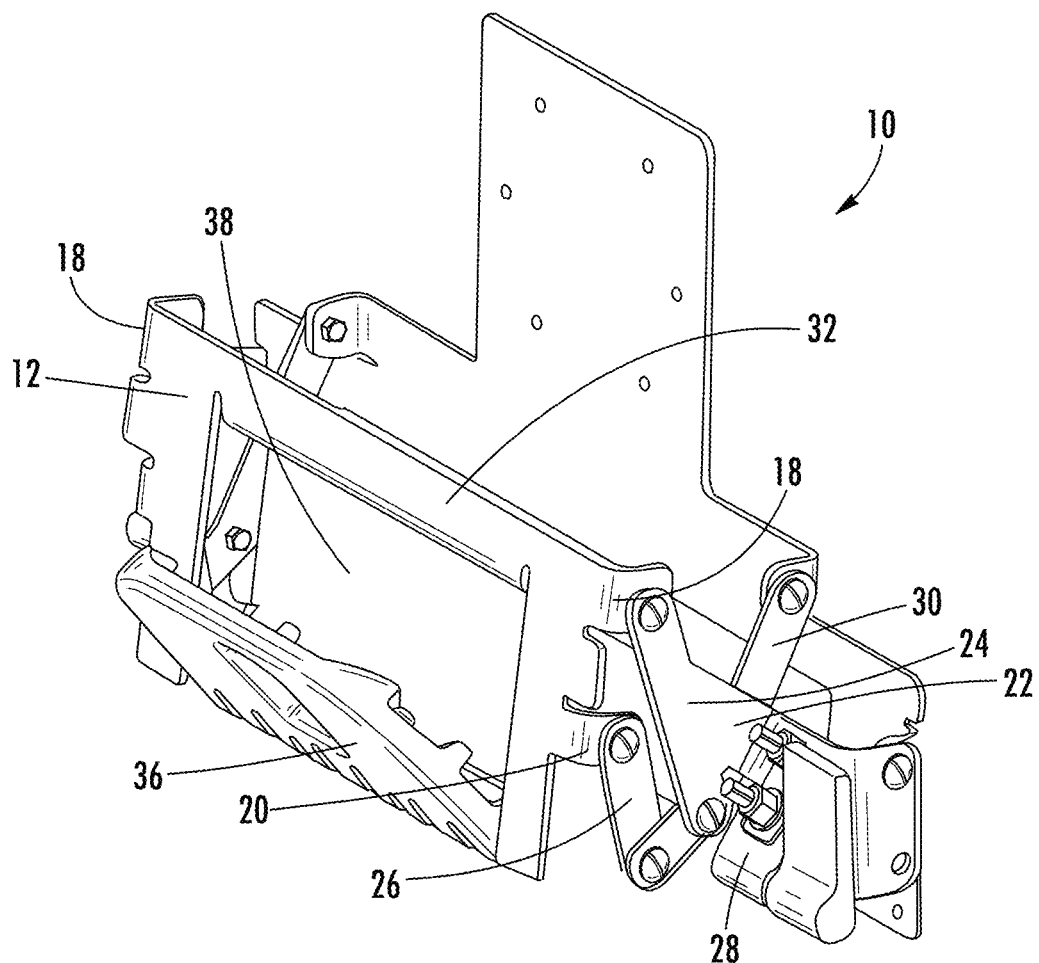
FIG. 3 is a perspective view of the support of FIG. 1 showing the body in a stowed position and the support structure in a partially deployed position.
Figure 4:
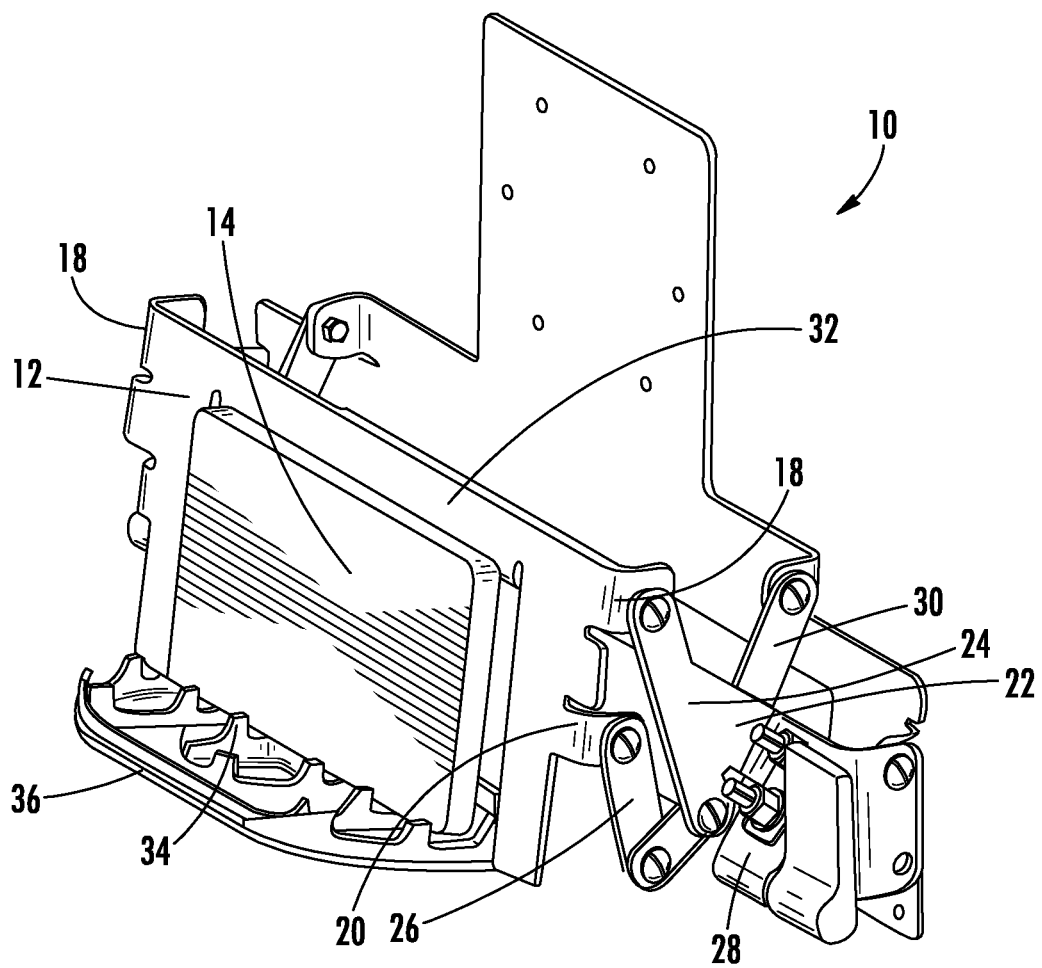
FIG. 4 is a perspective view of the support of FIG. 1 showing the body in a stowed position and the support structure in a fully deployed position securing a personal electronics device to the body.
Figure 5:
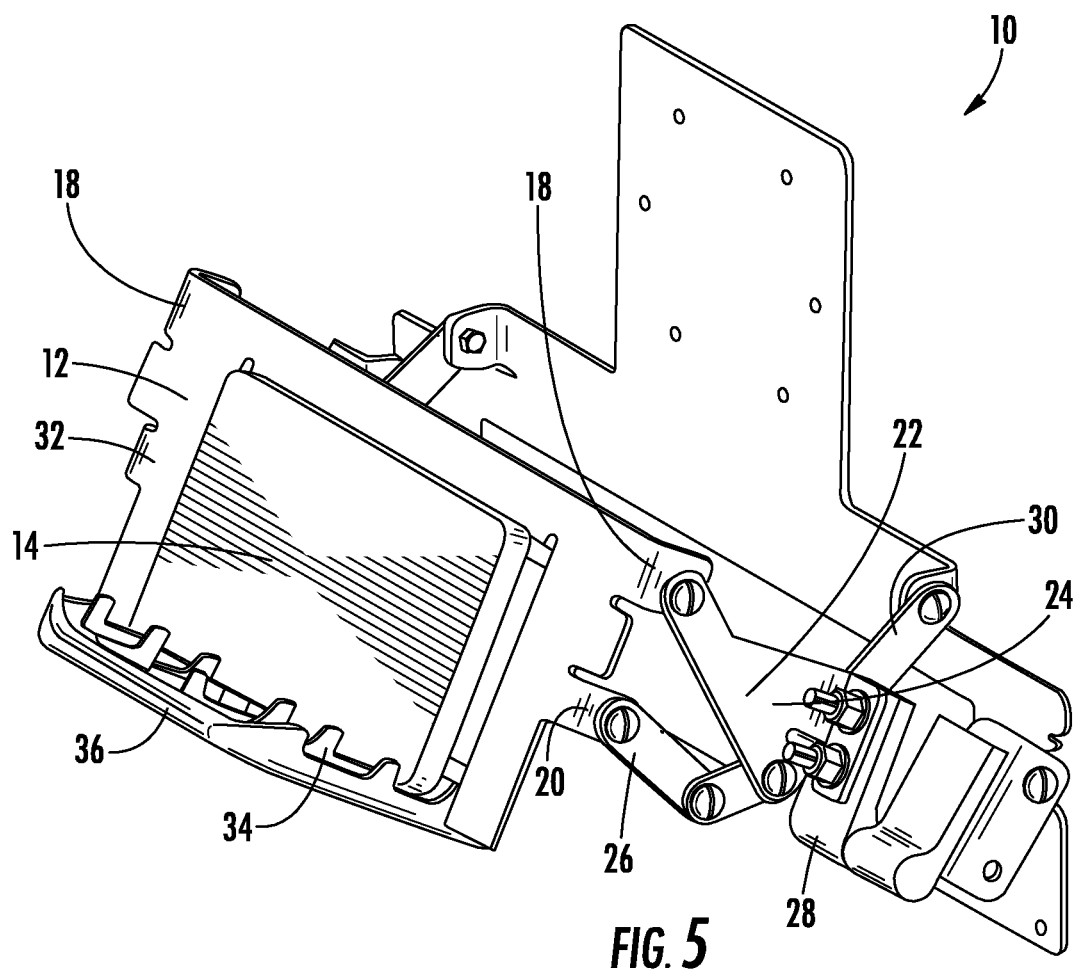
FIG. 5 is a perspective view of the support of FIG. 1 showing the body with the upper pivot location and the lower pivot location positioned away from the passenger seat back and the support structure in a fully deployed position securing a horizontally-oriented personal electronics device to the body.
Figure 6:
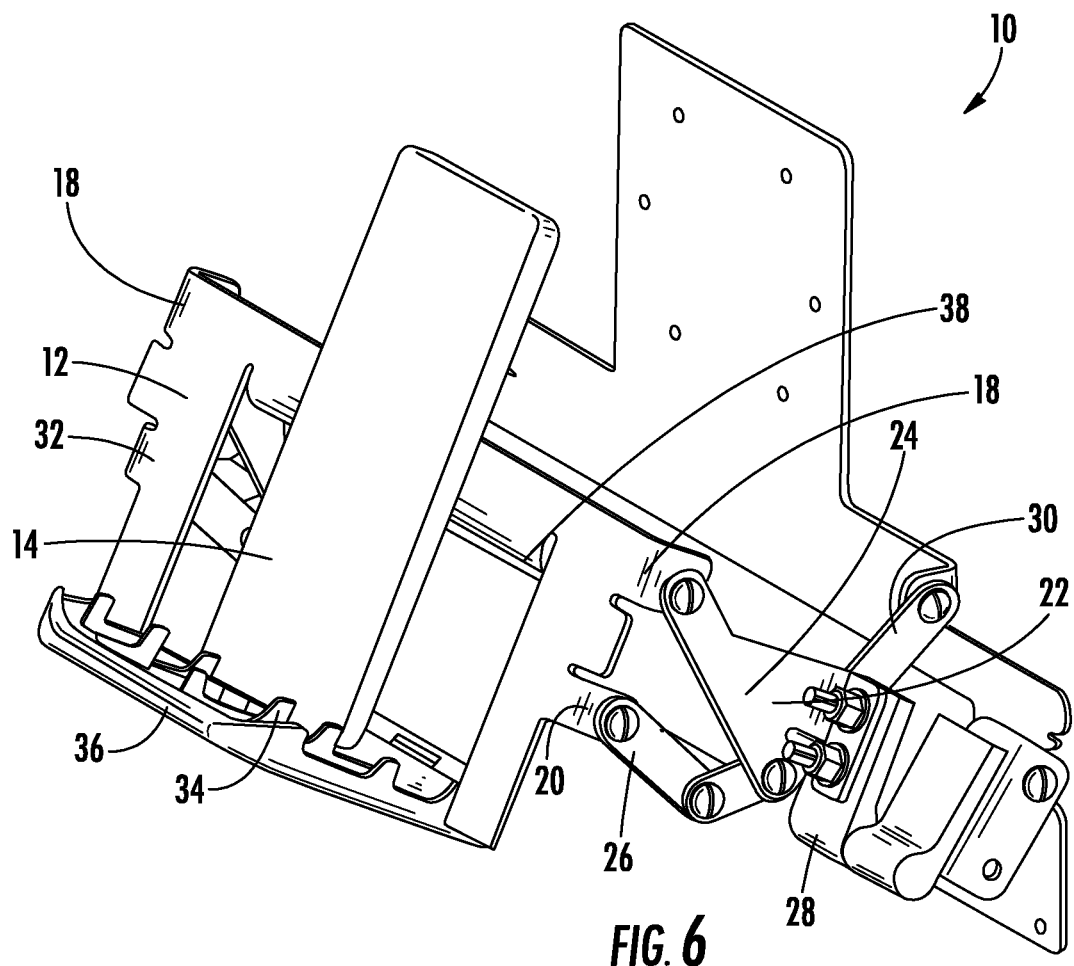
FIG. 6 is a perspective view of the support of FIG. 1 showing the body with the upper pivot location and the lower pivot location positioned away from the passenger seat back and the support structure in a fully deployed position securing a vertically-oriented personal electronics device to the body.
Figure 7:
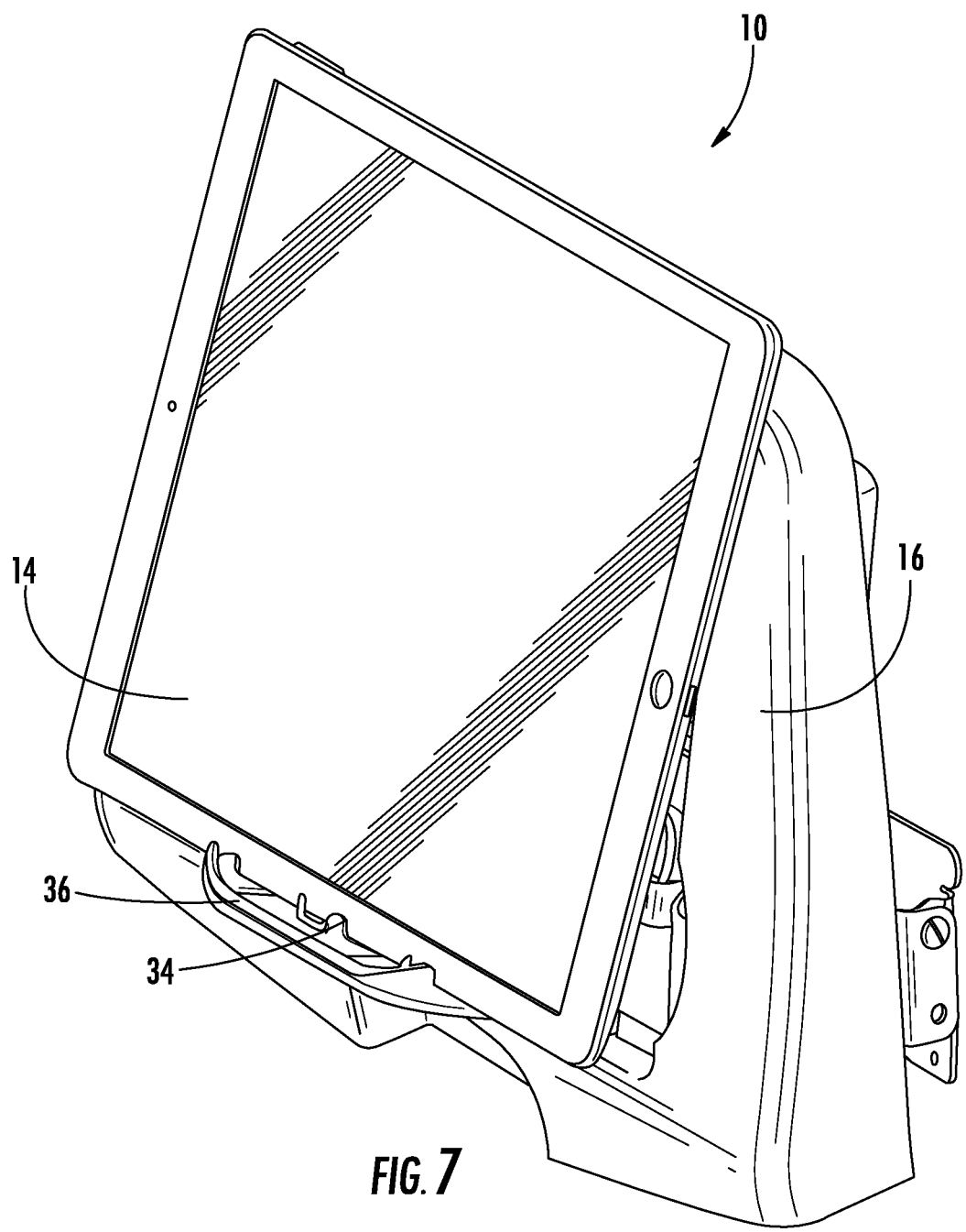
FIG. 7 is a perspective view of the passenger seat back and support of FIG. 1 showing the body in a stowed position and the support structure in a fully deployed position securing a large personal electronics device to the body and overlapping a location of an amenity item.
Figure 8:
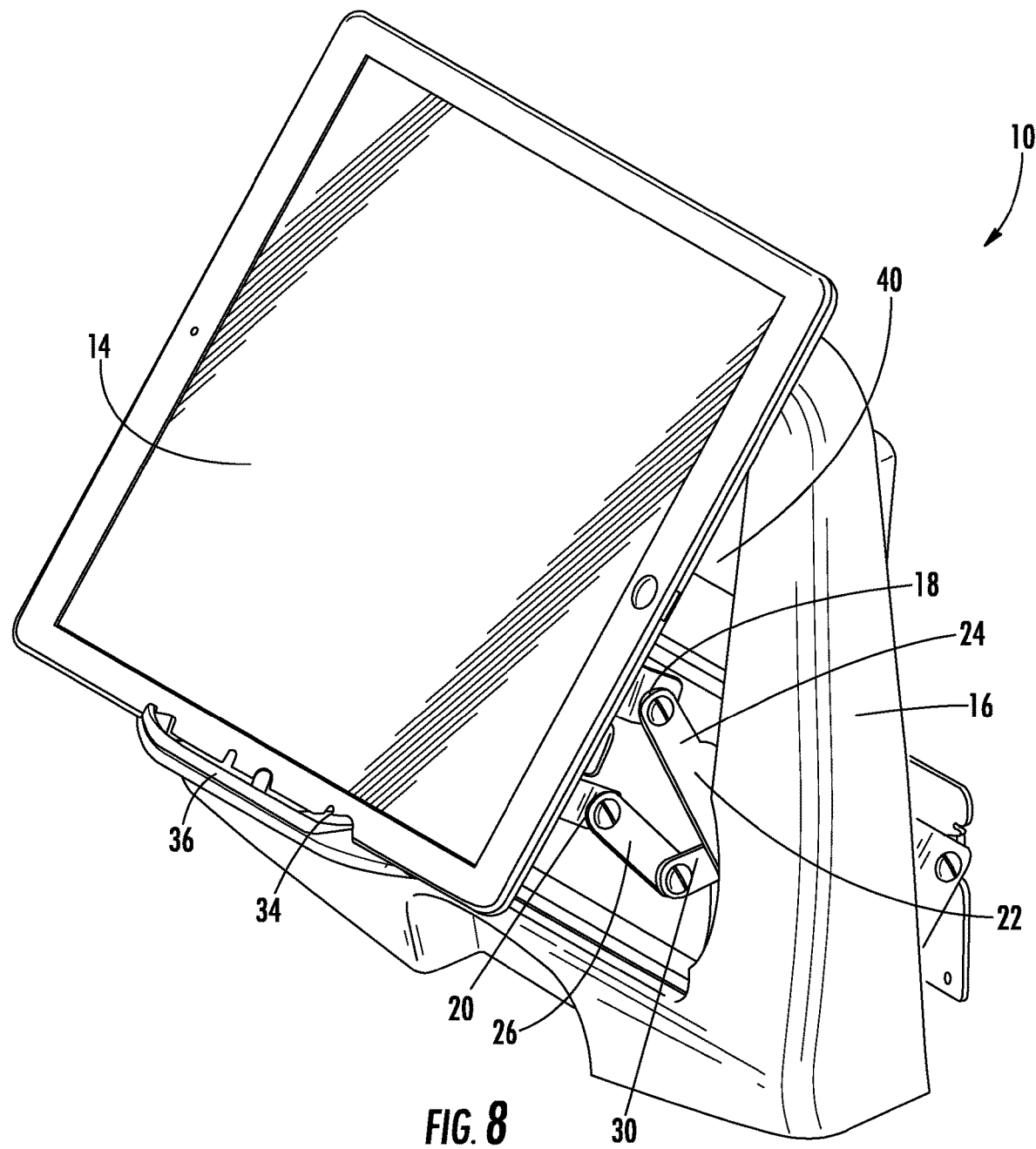
FIG. 8 is a perspective view of the passenger seat back and support of FIG. 1 showing the body with the upper pivot location and the lower pivot location positioned away from the passenger seat back and the support structure in a fully deployed position securing a large personal electronics device to the body and overlapping a location of an amenity item.
Figure 9:
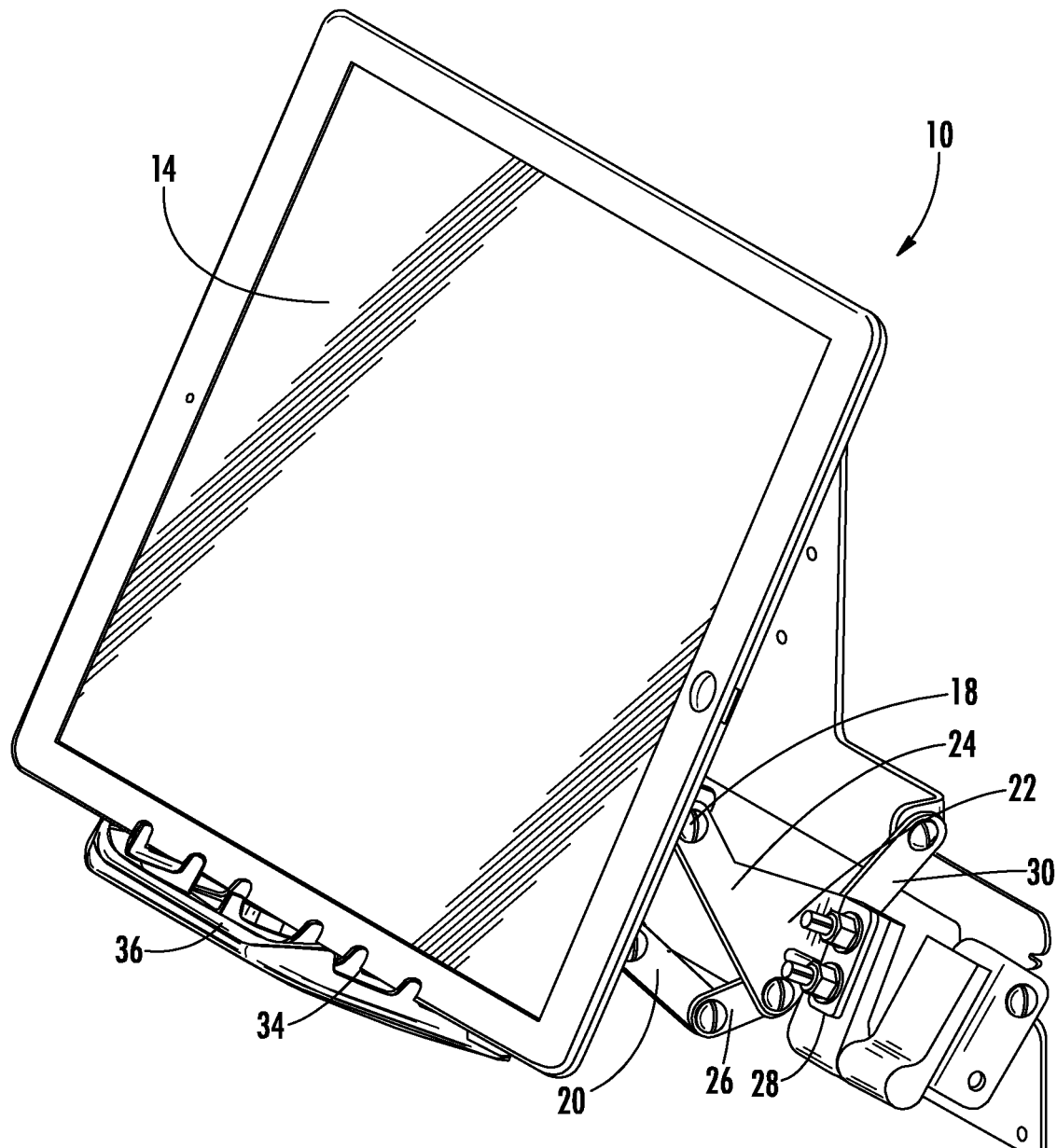
FIG. 9 is a perspective view of the support of FIG. 1 showing the body with the upper pivot location and the lower pivot location positioned away from the passenger seat back and the support structure in a fully deployed position securing a large personal electronics device to the body.
Figure 10:
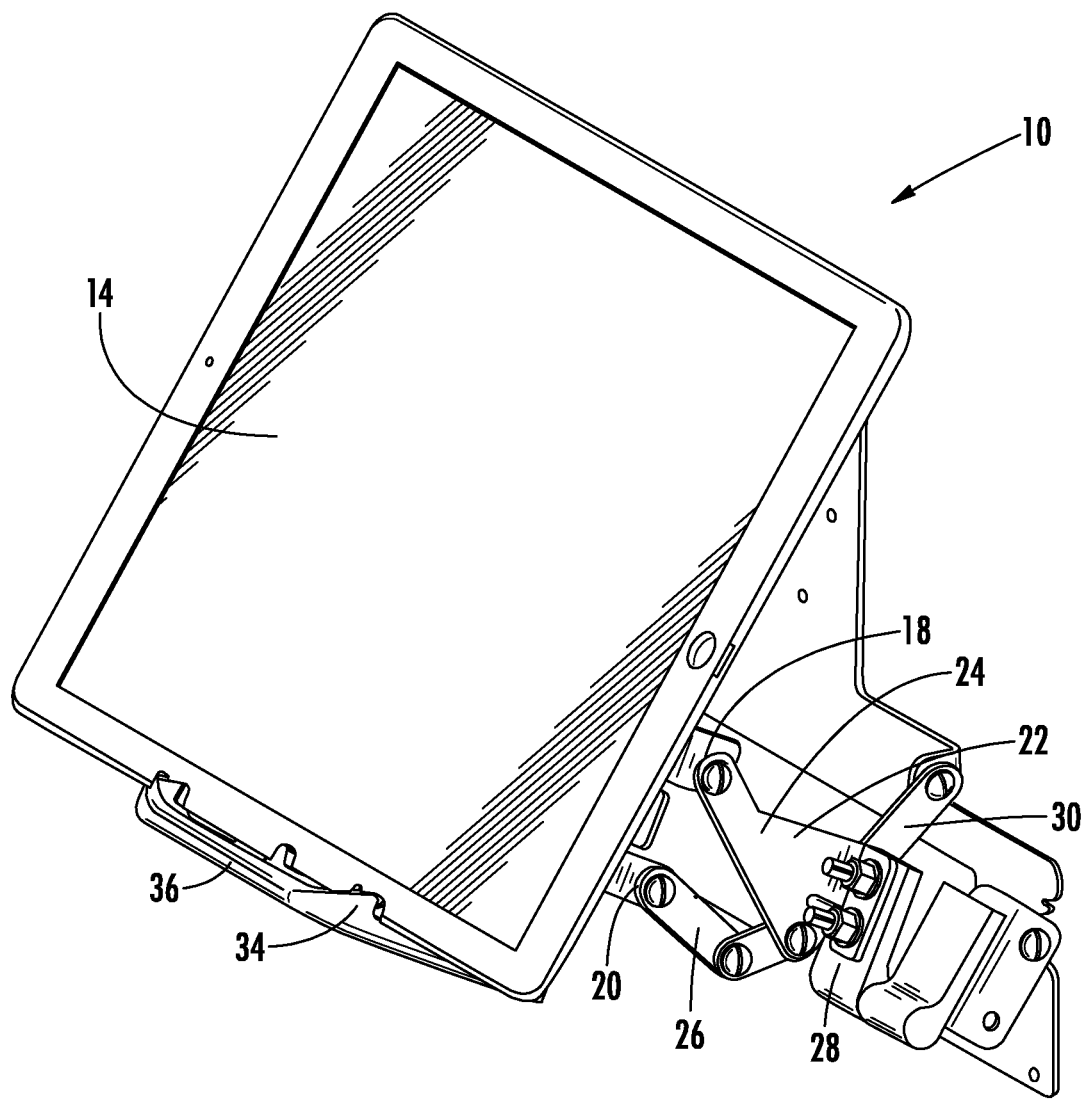
FIG. 10 is a perspective view of the support of FIG. 1 showing the body with the upper pivot location and the lower pivot location positioned away from the passenger seat back and the support structure in a fully deployed position securing a large personal electronics device to the body via projections that are positioned to increase the tilt of the personal electronics device.

The support structure 36 may be coupled to the body 12 in a fixed position or moveable relative to the body 12 between a stowed position and a deployed position. For example, as best shown in FIGS. 2-4, the support structure 36 is pivotally coupled to the body 12, but a person of ordinary skill in the relevant art will understand that the support structure 36 may be slidingly or otherwise moveably coupled to the body 12. Furthermore, in certain embodiments, the support structure 36 may be stowed within a recess 38 in the body 12.

In some embodiments, the body 12 is shaped to fit within a recess 38 in the passenger seat back 16. Furthermore, an amenity item 40, such as a literature pocket, a monitor display, or other device, may be positioned within the passenger seat back 16 above the recess 38. In these embodiments, when the upper pivot location 18 of the body 12 is rotated out of the recess 38, the height of the PED 14 held by the support 10 is able to overlap the amenity item 40 when viewed by a person facing the passenger seat back.

In the following, further examples are described to facilitate the understanding of the invention:

Example A. A support for holding a portable electronic device comprising:
- a body having an upper pivot location and a lower pivot location relative to a passenger seat back;
- a support structure coupled to the body; and
- a plurality of projections extending from a surface of the support structure;
- wherein each projection is shaped to receive a lower edge of a portable electronic device and secure the portable electronic device to the body when the portable electronic device is received by the plurality of projections.

Example B. The support of Example A or any of the preceding or subsequent examples, wherein an upper edge of the portable electronic device extends above the upper pivot location.

Example C. The support of Example A or any of the preceding or subsequent examples, further comprising an amenity item coupled to the passenger seat back above a location where the body is coupled to the passenger seat back.

Example D. The support of Example C or any of the preceding or subsequent examples, wherein an upper edge of the portable electronic device overlaps the amenity item when viewed by a person facing the passenger seat back.

Example E. The support of Example A or any of the preceding or subsequent examples, wherein the body has a stowed position within a recess of the passenger seat back.

Example F. The support of Example A or any of the preceding or subsequent examples, wherein each first pivot arm is coupled to the passenger seat back via a torsion hinge.

Example G. The support of Example A or any of the preceding or subsequent examples, wherein each second pivot arm is coupled to the passenger seat back via an additional pivot arm.

Example H. A support for holding a portable electronic device comprising:
- a body comprising a support structure configured to secure the portable electronic device to the body when the portable electronic device is received;
- a pair of first pivot arms coupled to an upper region of the body to create an upper pivot location, wherein the upper pivot location is adjustable along an arc of rotation of the first pivot arms relative to a passenger seat back; and
- a pair of second pivot arms coupled to a lower region of the body to create a lower pivot location, wherein the lower pivot location is adjustable along an arc of rotation of the second pivot arms relative to a passenger seat back.

Example I. The support of Example H or any of the preceding or subsequent examples, wherein an upper edge of the portable electronic device extends above the upper pivot location.

Example J. The support of Example H or any of the preceding or subsequent examples, further comprising an amenity item coupled to the passenger seat back above a location where the body is coupled to the passenger seat back.

Example K. The support of Example J or any of the preceding or subsequent examples, wherein an upper edge of the portable electronic device overlaps the amenity item when viewed by a person facing the passenger seat back.

Example L. The support of Example H or any of the preceding or subsequent examples, wherein the body has a stowed position within a recess of the passenger seat back.

Example M. The support of Example H or any of the preceding or subsequent examples, wherein each first pivot arm is coupled to the passenger seat back via a torsion hinge.

Example N. The support of Example H or any of the preceding or subsequent examples, wherein each second pivot arm is coupled to the passenger seat back via an additional pivot arm.

Example O. A support for holding a portable electronic device comprising:
- a body comprising a support structure configured to secure the portable electronic device to the body when the portable electronic device is received;
- wherein the body is coupled to a passenger seat via a pair of multibar mechanisms, each multibar mechanism comprising an upper pivot arm and a lower pivot arm;
- wherein the body comprises an upper pivot location that is adjustable by rotation of the upper pivot arms about a first connection point on the passenger seat back; and
- wherein the body comprises a lower pivot location that is adjustable by rotation of the lower pivot arms about a second connection point on the passenger seat back.

Example P. The support of Example O or any of the preceding or subsequent examples, wherein an upper edge of the portable electronic device extends above the upper pivot location.

Example Q. The support of Example O or any of the preceding or subsequent examples, further comprising an amenity item coupled to the passenger seat back above a location where the body is coupled to the passenger seat back.

Example R. The support of Example Q or any of the preceding or subsequent examples, wherein an upper edge of the portable electronic device overlaps the amenity item when viewed by a person facing the passenger seat back.

Example S. The support of Example O or any of the preceding or subsequent examples, wherein the first connection point on the passenger seat back comprises a torsion hinge.

Example T. The support of Example O or any of the preceding or subsequent examples, wherein the second connection point on the passenger seat back comprises an additional pivot arm.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A support for holding a portable electronic device comprising:
- a body having an upper pivot location and a lower pivot location relative to a passenger seat back;
- a support structure coupled to the body; and
- a plurality of projections extending from a surface of the support structure;

wherein each projection is shaped and arranged on the surface of the support structure to receive a lower edge of a portable electronic device and secure the portable electronic device against the body when the portable electronic device is received by the plurality of projections, further comprising a plurality of first and second pivot arms, wherein each second pivot arm is coupled to the passenger seat back via an additional pivot arm.

2. The support of claim 1, wherein an upper edge of the body is above the upper pivot location.

3. The support of claim 1, wherein the body has a stowed position within a recess of the passenger seat back.

4. The support of claim 1, wherein each first pivot arm is coupled to the passenger seat back via a torsion hinge.

5. A passenger seat back assembly comprising the support of claim 1, a passenger seat back, wherein the body of the support is coupled to the passenger seat back, and an amenity item coupled to the passenger seat back above a location where the body of the support is coupled to the passenger seat back.

6. The passenger seat back assembly of claim 5, further comprising a portable electronic device, wherein an upper edge of the portable electronic device overlaps the amenity item when viewed by a person facing the passenger seat back.

7. A support for holding a portable electronic device comprising:
a body;
a support structure coupled to the body and configured to secure the portable electronic device against the body when the portable electronic device is received;
a pair of first pivot arms coupled to an upper region of the body to create an upper pivot location, wherein the upper pivot location is adjustable along an arc of rotation of the first pivot arms relative to a passenger seat back; and
a pair of second pivot arms coupled to a lower region of the body to create a lower pivot location, wherein the lower pivot location is adjustable along an arc of rotation of the second pivot arms relative to a passenger seat back.

8. The support of claim 7, wherein an upper edge of the body is above the upper pivot location.

9. The support of claim 7, wherein the body has a stowed position within a recess of the passenger seat back.

10. The support of claim 7, wherein each first pivot arm is coupled to the passenger seat back via a torsion hinge.

11. The support of claim 7, wherein each second pivot arm is coupled to the passenger seat back via an additional pivot arm.

12. A passenger seat back assembly comprising the support of claim 7, a passenger seat back, wherein the body of the support is coupled to the passenger seat back, and an amenity item coupled to the passenger seat back above a location where the body of the support is coupled to the passenger seat back.

13. The passenger seat back assembly of claim 12, further comprising a portable electronic device, wherein an upper edge of the portable electronic device overlaps the amenity item when viewed by a person facing the passenger seat back.

14. A support for holding a portable electronic device comprising:
a body;
a support structure coupled to the body and configured to secure the portable electronic device against the body when the portable electronic device is received,
wherein the body is coupled to a passenger seat via a pair of multibar mechanisms, each multibar mechanism comprising an upper pivot arm and a lower pivot arm,
wherein the body comprises an upper pivot location that is adjustable by rotation of the upper pivot arms about a first connection point on the passenger seatback, and
wherein the body comprises a lower pivot location that is adjustable by rotation of the lower pivot arms about a second connection point on the passenger seat back.

15. The support of claim 14, wherein an upper edge of the body is above the upper pivot location.

16. A passenger seat back assembly comprising the support of claim 14, a passenger seat back, wherein the body of the support is coupled to the passenger seat back, and an amenity item coupled to the passenger seat back above a location where the body is coupled to the passenger seat back.

17. The passenger seat back assembly of claim 16, further comprising a portable electronic device, wherein an upper edge of the portable electronic device overlaps the amenity item when viewed by a person facing the passenger seat back.

18. The support of claim 14, wherein the first connection point on the passenger seat back comprises a torsion hinge.

19. The support of claim 14, wherein the second connection point on the passenger seat back comprises an additional pivot arm.

* * * * *